(12) United States Patent
Dupont et al.

(10) Patent No.: US 7,702,434 B2
(45) Date of Patent: Apr. 20, 2010

(54) INDICATING APPARATUS FOR A MOTOR VEHICLE

(75) Inventors: Cedric Dupont, Sunnyvale, CA (US); Arne Stoschek, Palo Alto, CA (US); Sven Strohband, Mountain View, CA (US)

(73) Assignee: Volkswagen AG, Wolfsburg (DE)

( * ) Notice: Subject to any disclaimer, the term of this patent is extended or adjusted under 35 U.S.C. 154(b) by 1586 days.

(21) Appl. No.: 10/934,139

(22) Filed: Sep. 3, 2004

(65) Prior Publication Data

US 2005/0119799 A1 Jun. 2, 2005

Related U.S. Application Data

(60) Provisional application No. 60/500,122, filed on Sep. 3, 2003.

(51) Int. Cl.
G01M 17/00 (2006.01)
G05F 7/00 (2006.01)
G06F 19/00 (2006.01)

(52) U.S. Cl. ............... 701/29; 359/267; 359/270; 359/271; 359/273; 205/223; 257/E33.059; 257/E23.044

(58) Field of Classification Search ............ 701/1, 701/29, 116; 340/461; 345/4; 359/455, 359/274, 265–273, 275; 205/205, 223, 225, 205/247, 264–266, 257; 257/E33.059, E23.044; 206/223
See application file for complete search history.

(56) References Cited

U.S. PATENT DOCUMENTS

| | | | | |
|---|---|---|---|---|
| 3,839,857 A | * | 10/1974 | Berets et al. | 368/82 |
| 4,006,969 A | * | 2/1977 | Kouchi et al. | 345/4 |
| 4,634,242 A | * | 1/1987 | Taguchi et al. | 359/512 |
| 4,750,816 A | * | 6/1988 | Ito et al. | 359/268 |
| 5,682,267 A | * | 10/1997 | Tonar et al. | 359/603 |
| 5,689,370 A | * | 11/1997 | Tonar et al. | 359/603 |
| 5,903,382 A | * | 5/1999 | Tench et al. | 359/265 |
| 5,920,256 A | * | 7/1999 | Toffolo et al. | 340/461 |
| 5,923,456 A | * | 7/1999 | Tench et al. | 359/266 |
| 6,016,481 A | | 1/2000 | Failing, Jr. et al. | |
| 6,046,682 A | | 4/2000 | Zimmerman et al. | |

(Continued)

FOREIGN PATENT DOCUMENTS

DE 199 41 960 3/2001

(Continued)

OTHER PUBLICATIONS

J. Duchene et al, "Electrolytic Display", IEEE Transactions on Electron Devices, vol. ED-26, No. 8, pp. 1243-1245, (Aug. 1979). Bruce M. Howard et al, "Reversible Electrodeposition of Bismuth Thin Films for Flat Panel Display Applications", Proc. Symp. on Electrochemically Deposited Thin Film, San Diego, CA, Proc. vol. 93-26, pp. 353-361, (1993).*

(Continued)

Primary Examiner—Cuong H Nguyen
(74) Attorney, Agent, or Firm—Kenyon & Kenyon LLP (57) ABSTRACT

A motor vehicle and an indicating apparatus for a motor vehicle, includes a display for optical depiction of information concerning the motor vehicle by the emission of light, and having a decorative layer positioned on the display.

18 Claims, 6 Drawing Sheets

U.S. PATENT DOCUMENTS

| | | | |
|---|---|---|---|
| 6,076,023 A | 6/2000 | Sato | |
| 6,111,685 A * | 8/2000 | Tench et al. | 359/267 |
| 6,166,847 A * | 12/2000 | Tench et al. | 359/266 |
| 6,166,848 A * | 12/2000 | Cammenga et al. | 359/267 |
| 6,175,441 B1 * | 1/2001 | Heuer et al. | 359/273 |
| 6,253,190 B1 | 6/2001 | Sutherland | |
| 6,256,135 B1 * | 7/2001 | Tench et al. | 359/271 |
| 6,301,039 B1 * | 10/2001 | Tench | 359/267 |
| 6,400,491 B1 * | 6/2002 | Tench et al. | 359/270 |
| 6,411,877 B2 | 6/2002 | Böckmann et al. | |
| 6,507,428 B1 * | 1/2003 | Heuer et al. | 359/273 |
| 6,552,843 B1 * | 4/2003 | Tench et al. | 359/321 |
| 6,621,471 B1 * | 9/2003 | Ozaki et al. | 345/4 |
| 6,680,792 B2 * | 1/2004 | Miles | 359/291 |
| 6,700,692 B2 * | 3/2004 | Tonar et al. | 359/265 |
| 6,721,080 B1 * | 4/2004 | Tench et al. | 359/265 |
| 6,747,779 B1 * | 6/2004 | Morin et al. | 359/265 |
| 6,762,069 B2 * | 7/2004 | Huang et al. | 438/22 |
| 6,772,057 B2 * | 8/2004 | Breed et al. | 701/45 |
| 6,798,556 B2 * | 9/2004 | Tench et al. | 359/269 |
| 6,841,803 B2 * | 1/2005 | Aizawa et al. | 257/98 |
| 7,012,728 B2 * | 3/2006 | Morin et al. | 359/265 |
| 7,022,210 B2 * | 4/2006 | Tench | 204/290.14 |
| 7,265,889 B2 * | 9/2007 | Morin et al. | 359/265 |
| 7,317,566 B2 * | 1/2008 | Tench et al. | 359/265 |
| 7,598,927 B2 * | 10/2009 | Yamazaki et al. | 345/7 |
| 2002/0002432 A1 | 1/2002 | Böckmann et al. | |
| 2002/0154379 A1 * | 10/2002 | Tonar et al. | 359/267 |
| 2003/0041496 A1 | 3/2003 | Hagen et al. | |
| 2004/0046751 A1 | 3/2004 | Heimermann et al. | |
| 2004/0061919 A1 * | 4/2004 | Tench et al. | 359/265 |
| 2004/0070551 A1 * | 4/2004 | Walck et al. | 345/7 |
| 2004/0096998 A1 * | 5/2004 | Huang et al. | 438/29 |
| 2004/0150866 A1 * | 8/2004 | Tench et al. | 359/265 |
| 2005/0203790 A1 | 9/2005 | Cohen | |
| 2005/0248825 A1 * | 11/2005 | Warren et al. | 359/265 |

FOREIGN PATENT DOCUMENTS

| | | |
|---|---|---|
| DE | 101 39 693 | 5/2002 |
| DE | 10 2006 023 604 A * | 11/2007 |
| EP | 0 366 132 | 5/1990 |
| JP | 57189128 A * | 11/1982 |
| JP | 01058529 A * | 3/1989 |
| JP | 2620691 B2 * | 6/1997 |
| JP | 2003-299126 * | 8/2003 |
| WO | WO 00/21795 | 4/2000 |

OTHER PUBLICATIONS

John P. Ziegler et al, "Applications of reversible electrodeposition electrochromic devices", Solar Energy Materials and Solar Cells, vol. 39, pp. 317-331, (1995).*

John P. Ziegler et al, "Nucleation and Growth of Thin Film Reversible Electrodeposition Electrochromic Materials", The Electrochemical Society Proceedings, vol. 94-31, pp. 23-33, (1994).*

Variable message sign and dynamic regional traffic guidance Shi, W. et al., Intelligent Transportation Systems Magazine, IEEE; vol. 1, Issue 3, Fall 2009 pp. 15-21 Digital Object Identifier 10.1109/MITS.2009.934642.*

Cross-layer design proposals for wireless mobile networks: a survey and taxonomy; Foukalas, F. et al.; Communications Surveys & Tutorials, IEEE; vol. 10, Issue 1, First Quarter 2008 pp. 70-85; Digital Object Identifier 10.1109/COMST.2008.4483671.*

Optical Data Link Employing Organic Light-Emitting Diodes and Organic Photodiodes as Optoelectronic Components; Punke, M. et al.; Lightwave Technology, Journal of; vol. 26, Issue 7, Apr. 1, 2008 pp. 816-823; Digital Object Identifier 10.1109/JLT.2007.915206.*

Future Optical Networks; O'Mahony, M. J.; Politi, C.; Klonidis, D.; Nejabati, R.; Simeonidou, D.; Lightwave Technology, Journal of vol. 24, Issue 12, Dec. 2006 pp. 4684-4696; Digital Object Identifier 10.1109/JLT.2006.885765.*

Tenth IEEE International Conference on Computer Vision—Table of Contents; Computer Vision, 2005. ICCV 2005. Tenth IEEE International Conference on; vol. 1, Oct. 17-21, 2005 pp. v-xix; Digital Object Identifier 10.1109/ICCV.2005.237.*

In-mould integration of electronics into mechanics and reliability of overmoulded electronic and optoelectronic components Alajoki, T. ; Microelectronics and Packaging Conference, 2009. EMPC 2009. European; Jun. 15-18, 2009 pp. 1-6.*

Specialized dynamic optimizations for high-performance energy-efficient microarchitecture; Almog, Y. et al.; Code Generation and Optimization, 2004. CGO 2004. International Symposium on, 2004 pp. 137-148; Digital Object Identifier 10.1109/CGO.2004.1281670.*

Base technologies for vehicular networking applications: review and case studies;Rodelgo-Lacruz, M.; et al., Industrial Electronics, 2007. ISIE 2007. IEEE International Symposium on; Jun. 4-7, 2007 pp. 2567-2572; Digital Object Identifier 10.1109/ISIE.2007.4375012.*

D.M. Tench et al., "Reversible Electrochemical Mirror (REM) Smart Window," The Electrochemical Society, Inc., 203$^{rd}$ Meeting, Paris, France, Apr. 27, 2003, Session Q1, Electrochromic Materials and Applications, vol. 2003-17, pp. 190-198.

* cited by examiner

INDICATING APPARATUS FOR A MOTOR VEHICLE

CROSS-REFERENCE TO RELATED APPLICATIONS

The present application claims the benefit of U.S. Provisional Application No. 60/500,122, filed on Sep. 3, 2003, which is expressly incorporated herein in its entirety by reference thereto.

FIELD OF THE INVENTION

The present invention relates to a motor vehicle and an indicating apparatus having a display for optical depiction of information concerning the motor vehicle.

BACKGROUND INFORMATION

As the functionalities of a motor vehicle increase, it may become necessary to configure indicators and operating elements for various functions such that they may be easy for a driver of a motor vehicle to recognize and to operate.

Various proposed solutions to this problem are believed to be described in the literature. For example, according to International Published Patent Application No. WO 00/21795, provision is made for arranging a display field or indicating field in multiple parts, one part of the indicating field representing an information panel on which information about the selected menu or selected function, as well as (optionally) important information about other functional groups, is reproduced. On the remaining part of the indicating field, functional and/or status indications are conspicuously generated such that they are each allocated to an operating element, e.g., to the operating element to which, in that selection menu, the respective function for operation is allocated. In addition, a return function to a higher-level menu is allocated to one of the functions indicated in the remaining display field and allocated to one of the operating elements.

According to German Published Patent Application No. 101 39 693, in the context of modern electronic devices in a vehicle that constantly offer additional functions with more and more options, because of the limited installation space for the associated operating elements, multi-function operating elements have been created with which various functions of the connected devices can be performed. European Published Patent Application No. 0 366 132, for example, describes a multi-function operating device for motor vehicles in which the selection of function groups (MENUS) and of individual functions is accomplished by a rotary switch, and in which an ENTER function can be initiated, one and the same bidirectional rotary switch serving for menu selection and for individual function selection. This rotary switch has click-stop positions to which menus or individual functions are allocated, in which context the ENTER function can be initiated by an axial motion of the rotary switch. A multi-function operating device of this kind serves, for example, to enter the destination of a navigation system. An alphanumeric keypad, within which the user can move back and forth by the bidirectional motion of the rotary switch, is imaged for that purpose on an indicating unit. When the cursor is then located on the desired alphanumeric character, the latter can be selected by an axial motion of the rotary switch and transferred into the navigation system. It is also described in German Published Patent Application No. 199 41 960 to arrange an operating element as a cylinder, rotatable bidirectionally about its longitudinal axis, that is movable resiliently with respect to the longitudinal axis.

For convenient operation and in order to simplify operating haptics, German Published Patent Application No. 101 39 693 describes that a bidirectional rotary element may be arranged with a rotation axis extending substantially parallel to a vehicle part surface. Using the bidirectional rotary element, a bidirectional selection or choice of function groups and/or functions within a menu plane is made. Selection of the menu planes is accomplished via a second operating device. The second operating device can be implemented by displacement of the bidirectional rotary element parallel to the rotation axis of the bidirectional rotary element. A further variant provides for arranging the bidirectional rotary element as a rocker in the direction of the rotation axis in order to constitute the second operating device. Another solution provides for the provision of a second operating device which has two operating elements that are actuable parallel to the rotation axis of the bidirectional rotary element. The second operating device is arranged on or at least partially in the bidirectional rotary element, and constitutes a physical unit with the rotary element. In addition, the bidirectional rotary element is arranged for selection or choice in two directions on the indicating apparatus, and the second operating element for selection in two further directions, e.g., perpendicular to the selection directions of the bidirectional rotary element.

SUMMARY

An example embodiment of the present invention may improve the operation of a motor vehicle. It may be provided that customer acceptance, e.g., in the higher price segment, may be thereby not worsened but instead may be enhanced as much as possible.

In an example embodiment of the present invention, a motor vehicle includes a display for optical depiction of information concerning the motor vehicle by the emission of light, and includes a passive decorative layer positioned on the display, the passive decorative layer being substantially non-transparent at a position when the display is emitting no light at that position, and the passive decorative layer being substantially transparent at that position when the display is emitting light at that position.

In an example embodiment of the present invention, the passive decorative layer may be arranged as a company logo. In an example embodiment of the present invention, the motor vehicle may include a control system for activating the display such that, e.g., when an ignition key is turned but before an engine of the motor vehicle is started, a company logo is depictable by the passive decorative layer. In this case, e.g., in an example embodiment of the present invention, the passive decorative layer may substantially completely cover the display. Two different passive layers may also be provided, the display being substantially completely covered by the one passive layer and being concealed when the motor vehicle is in the switched-off state, and a symbol or a company logo, which is visible when the motor vehicle is in the switched-off state or when no light is being emitted by the display, being depicted by the other passive layer. Any other graphical or pictorial representation may be implemented with the aid of the passive layer.

In an example embodiment of the present invention, the passive decorative layer may be arranged as part of an analog indicator, e.g., as a border, i.e., edge, of an analog indicator.

In an example embodiment of the present invention, the motor vehicle may include a control system for activating the display such that a pointer for the analog indicator is depictable on the display. In an example embodiment of the present invention, the display may be (additionally) activatable by the control system such that a scale for the analog indicator is depictable on the display.

In an example embodiment of the present invention, the motor vehicle may include a navigation system, a telephone, and/or a music system, etc., information outputted by the navigation system, telephone, and/or music system, etc., being depictable on the display.

In an example embodiment of the present invention, the motor vehicle may include a control system for bringing the display into at least one driving state and one information state, in the driving state a speed of the motor vehicle being indicated by an analog indicator depicted on the display, and in the information state a speed of the motor vehicle being indicated by the display by a digital indicator depicted on the display, and additional information, for example an output of a navigation system, a telephone, and/or a music system, etc., being indicated.

In an example embodiment of the present invention, the display may be positioned behind a steering wheel of the motor vehicle. In an example embodiment of the present invention, an operating element for operating the display may be positioned on the steering wheel.

According to an example embodiment of the present invention, an indicating apparatus for a motor vehicle includes a display for optical depiction of information concerning the motor vehicle by the emission of light, includes a passive decorative layer positioned on the display, the passive decorative layer being substantially non-transparent at a position when the display is emitting no light at that position, and the passive decorative layer being substantially transparent at that position when the display is emitting light at that position, and includes a control system for bringing the display into at least one driving state and one information state, in the driving state a speed of the motor vehicle being indicated by an analog indicator depicted on the display, and in the information state additional information, for example, an output of a navigation system, a telephone, and/or a music system, etc., being indicated by the display.

In an example embodiment of the present invention, in the information state, a speed of the motor vehicle may be indicated by the display by a digital indicator depicted on the display.

In an example embodiment of the present invention, the passive decorative layer may be arranged as a symbol or a company logo. Any other pictorial representation is possible. In an example embodiment of the present invention, the display may be activatable by the control system such that, e.g., when an ignition key is turned but before an engine of the motor vehicle is started, a company logo is depictable by the passive decorative layer. In this case, e.g., in an example embodiment of the present invention, the passive decorative layer may substantially completely cover the display. Two different passive layers may also be provided, the display being substantially completely covered by the one passive layer and being concealed when the motor vehicle is in the switched-off state, and a company logo, which is visible when the motor vehicle is in the switched-off state—or when no light is being emitted by the display—being depicted by the other passive layer.

In an example embodiment of the present invention, the passive decorative layer may be arranged as part of an analog indicator, e.g., as a border, i.e., edge, of an analog indicator. Alternatively, the display may be activatable by the control system such that the passive decorative layer constitutes a border of the analog indicator. For that purpose, provision is made, e.g., for the display to emit no light in the region provided for the border.

According to an example embodiment of the present invention, an indicating apparatus for a motor vehicle includes a display for optical depiction of information concerning the motor vehicle, includes an active decorative layer, positioned on the display, that may assume a state in which it is substantially transparent, and that may assume a state in which it is substantially non-transparent, and includes a control system for activating the active decorative layer such that the active decorative layer is substantially transparent or substantially non-transparent as a function of a control signal of the control system. In an example embodiment of the present invention, the active decorative layer may be substantially transparent in an energyless state.

In an example embodiment of the present invention, the active decorative layer is arranged as a company logo. In an example embodiment of the present invention, the active decorative layer may be arranged as part of an analog indicator, e.g., as a border of an analog indicator.

In an example embodiment of the present invention, the display may be activatable by the control system such that a pointer for the analog indicator is depictable on the display. In an example embodiment of the present invention, the display may (additionally) be activated by the control system such that a scale for the analog indicator is depictable on the display.

In an example embodiment of the present invention, the indicating apparatus may include a navigation system, a telephone, and/or a music system, etc., information outputted by the navigation system, the telephone, and/or the music system, etc., being depictable on the display.

In an example embodiment of the present invention, the display may be brought by the control system into at least one driving state and one information state, in the driving state a speed of the motor vehicle being indicated by an analog indicator depicted on the display, and in the information state a speed of the motor vehicle being indicated by the display by a digital indicator depicted on the display, and additional information, e.g., an output of a navigation system, a telephone, and/or a music system, etc., being indicated.

In an example embodiment of the present invention, the active decorative layer may include a REM layer, or the active decorative layer may be a REM layer. In this context, the display in an example embodiment of the present invention may be controlled by the control system such that the REM layer forms a border of an analog display.

According to an example embodiment of the present invention, an indicating apparatus for a motor vehicle includes a display for optical depiction of information concerning the motor vehicle by the emission of light, includes a passive decorative layer positioned on the display, the passive decorative layer being substantially non-transparent at a position when the display is emitting no light at that position, and the passive decorative layer being substantially transparent at that position when the display is emitting light at that position, and includes an active decorative layer, positioned on the passive decorative layer, that may assume a state in which it is substantially transparent and that may assume a state in which it is substantially non-transparent. The active decorative layer may, e.g., be activated independently of the display. In an example embodiment of the present invention, the indicating apparatus may include for that purpose a control system for activating the active decorative layer such that the active decorative layer is substantially transparent or substantially non-transparent as a function of a control signal of the control system.

In an example embodiment of the present invention, the passive decorative layer may be arranged as a symbol or a company logo. In an example embodiment of the present invention, the indicating apparatus may include a control system for activation of the display such, e.g., when an ignition key is turned but before an engine of the motor vehicle is started, a symbol or company logo is depictable by the passive decorative layer, any other pictorial representation being possible. In this case, e.g., in an example embodiment of the present invention, the passive decorative layer may substantially completely cover the display. Two different passive layers may also be provided, by the one passive layer the display being substantially completely covered and being concealed when the indicating apparatus is in the switched-off state—or when no light is being emitted by the display—and by the other passive layer a symbol or company logo being depicted that is visible when the indicating apparatus is in the switched-off state, or when no light is being emitted by the display.

In an example embodiment of the present invention, the active decorative layer may be arranged as part of an analog indicator, e.g., as a border of an analog indicator. In an example embodiment of the present invention, the display may be activatable by the control system such that a pointer for the analog indicator is depictable on the display. In an example embodiment of the present invention, the display may (additionally) be activated by the control system such that a scale for the analog indicator is depictable on the display.

In an example embodiment of the present invention, the active decorative layer may be a REM layer, or the active decorative layer may include a REM layer.

It may also be provided that the passive decorative layer is replaced by a REM layer. In this context, at least one active decorative layer (e.g., arranged as a REM layer, a CLC layer, an EC layer, etc.) and an active decorative layer arranged as a REM layer are located, e.g., one above the other.

According to an example embodiment of the present invention, a motor vehicle includes an indicating apparatus, which includes a display for optically representing information relating to the motor vehicle and a first REM layer arranged on the display. It may be provided that, as a function of a signal of a control system, the REM layer may assume a state, in which it is essentially transparent, and a state, in which it is essentially non-transparent and, e.g., reflective.

In an example embodiment of the present invention, the indicating apparatus may include at least one second REM layer. In an example embodiment of the present invention, the at least second REM layer may be positioned next to the first REM layer. The borders of analog displays may be implemented, for example, by REM layers positioned side by side.

A "company logo" in the present context may be a company designation, such as "VW" or the VW logo. It may also be a vehicle designation, such as "Phaeton." A company logo may also be an image of a motor vehicle, e.g., of the motor vehicle in which the display is installed. Any other pictorial representation is possible.

A "motor vehicle" in the present context may be, e.g., an individual land vehicle usable on public highways. Motor vehicles are not necessarily limited to land vehicles having an internal combustion engine.

"Information concerning the motor vehicle" or "information relating to the motor vehicle" in the present context may be, e.g., the speed of the motor vehicle, the rotation speed of an engine of the motor vehicle, the temperature of an engine of the motor vehicle, the fuel level, outputs of a navigation system, outputs of a telephone, outputs of a music system, the manufacturer of the motor vehicle, the model of the motor vehicle, etc.

According to an example embodiment of the present invention, a motor vehicle includes: a display device configured to optically depict information relating to the motor vehicle by emission of light; and a passive decorative layer arranged on the display, the passive decorative layer substantially non-transparent at a position in accordance with a non-emission of light at the position by the display and substantially transparent at the position in accordance with emission of light at the position by the display.

The passive decorative layer may be arranged as at least one of (a) a symbol and (b) a company logo.

The motor vehicle may include a control system configured to activate the display to depict at least one of (a) a symbol and (b) a company logo by the passive decorative layer before an engine of the motor vehicle is started.

The passive decorative layer may substantially completely cover the display.

The motor vehicle may include a control system configured to activate the display to depict at least one of (a) a symbol and (b) a company logo by the passive decorative layer before an engine of the motor vehicle is started.

The passive decorative layer may be arranged as a part of an analog indicator.

The passive decorative layer may be arranged as a border of an analog indicator.

The motor vehicle may include a control system configured to activate the display to depict a pointer of the analog indicator.

The control system may be configured to activate the display to depict a scale of the analog indicator.

The motor vehicle may include a control system including at least one of (a) a navigation system, (b) a telephone and (c) a music system, and the display may be configured to depict information outputted by the at least one of (a) the navigation system, (b) the telephone and (c) the music system.

The motor vehicle may include at least one of (a) a navigation system, (b) a telephone and (c) a music system, and the display may be configured to depict information outputted by the at least one of (a) the navigation system, (b) the telephone and (c) the music system.

The motor vehicle may include a control system configured to bring the display into a driving state and an information state. In the driving state, the display may be configured to depict an analog indicator to indicate a speed of the motor vehicle; and, in the information state, the display may be configured to depict a digital indicator to indicate the speed of the motor vehicle and the display may be configured to indicate additional information.

The passive decorative layer may be arranged as a border of the analog indicator.

The control system may be configured to activate the display so that the passive decorative layer corresponds to a border of the analog indicator.

The additional information may include an output of a navigation system.

The display may be arranged behind a steering wheel of the motor vehicle.

An operating element configured to operate the display may be arranged on the steering wheel.

According to an example embodiment of the present invention, an indicating apparatus for a motor vehicle includes: a display configured to optically depict information relating to the motor vehicle by emission of light; a passive decorative layer arranged on the display, the passive decorative layer substantially non-transparent at a position in accordance with a non-emission of light at the position by the display and substantially transparent at the position in accordance with emission of light at the position by the display; and a control system configured to bring the display into a driving state and an information state, in the driving state, the display configured to indicate a speed of the motor vehicle by an analog indicator depicted on the display, in the information state, the display configured to indicate additional information.

In the information state, the display may be configured to depict a digital indicator to indicate the speed of the motor vehicle.

The passive decorative layer may be arranged as at least one of (a) a pictorial representation and (b) a company logo.

The control system may be configured to activate the display to depict at least one of (a) a symbol, (b) a pictorial representation and (c) a company logo by the passive decorative layer.

The passive decorative layer may be arranged as a border of the analog indicator.

The control system may be configured to activate the display so that the passive decorative layer corresponds to a border of the analog indicator.

The additional information may include an output of a navigation system.

According to an example embodiment of the present invention, an indicating apparatus for a motor vehicle includes: a display configured to optically depict information relating to a motor vehicle; an active decorative layer arranged on the display, the active decorative layer having a substantially transparent state and a substantially non-transparent state; and a control system configured to activate the active decorative layer, the active decorative layer one of (a) substantially transparent and (b) substantially non-transparent as a function of a control signal of the control system.

The active decorative layer may be substantially transparent in an energyless state.

The active decorative layer may be arranged as at least one of (a) a symbol and (b) a company logo.

The active decorative layer may be arranged as at least one of (a) a part of an analog indicator and (b) a border of an analog indicator.

The control system may be configured to depict on the display at least one of (a) a pointer of the analog indicator and (b) a scale of the analog indicator.

The control system may include at least one of (a) a navigation system, (b) a telephone and (c) a music system, and the display may be configured to depict information outputted by the at least one of (a) the navigation system, (b) the telephone and (c) the music system.

The indicating apparatus may include at least one of (a) a navigation system, (b) a telephone and (c) a music system, and the display may be configured to depict information outputted by the at least one of (a) the navigation system, (b) the telephone and (c) the music system.

The control system may be configured to bring the display into a driving state and an information state. In the driving state, the display may be configured to depict an analog indicator to indicate a speed of the motor vehicle; and, in the information state, the display may be configured to depict a digital indicator to indicate a speed of the motor vehicle and the display may be configured to indicate additional information.

The additional information may include an output of a navigation system.

The control system may be configured to control the display so that the active decorative layer corresponds to a border of the analog indicator.

The active decorative layer may include a REM layer.

According to an example embodiment of the present invention, an indicating apparatus for a motor vehicle may include: a display configured to optically depict information relating to the motor vehicle by emission of light; a passive decorative layer arranged on the display, the passive decorative layer substantially non-transparent at a position in accordance with a non-emission of light by the display at the position, the passive decorative layer substantially transparent at the position in accordance with an emission of light by the display at the position; and an active decorative layer arranged on the passive decorative layer, the active decorative layer including a substantially transparent state and a substantially non-transparent state.

The indicating apparatus may include a control system configured to activate the active decorative layer to be one of (a) substantially transparent and (b) substantially non-transparent as a function of a control signal of the control system.

The passive decorative layer may be arranged as at least one of (a) a symbol and (b) a company logo.

The passive decorative layer may substantially completely cover the display.

The passive decorative layer may be configured to depict at least one of (a) a symbol and (b) a company logo.

The active decorative layer may be arranged as a part of an analog indicator.

The active decorative layer may be arranged as a border of an analog indicator.

The control system may be configured to activate the display to depict a pointer of the analog indicator.

The control system may be configured to activate the display to depict a scale of the analog indicator.

The active decorative layer may be arranged as a part of an analog indicator.

The active decorative layer may be arranged as a border of an analog indicator.

The active decorative layer may include a REM layer.

The passive decorative layer may include a REM layer.

According to an example embodiment of the present invention, an indicating apparatus for a motor vehicle includes: a display configured to optically represent information relating to the motor vehicle; and a first REM layer arranged on the display.

The indicating apparatus may include at least one second REM layer, which may be arranged next to the first REM layer.

DETAILED DESCRIPTION

Figure 1:
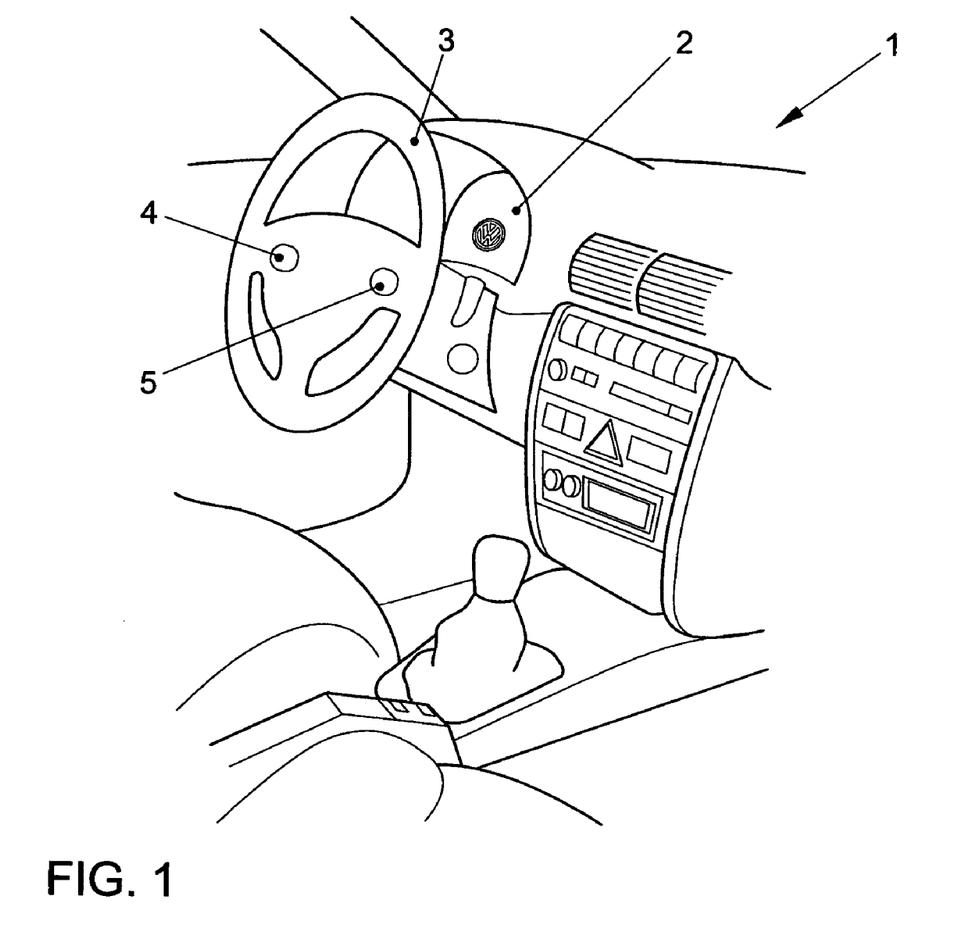
FIG. 1 illustrates an example embodiment of a cockpit of a motor vehicle.

FIG. 1 illustrates a cockpit of a motor vehicle 1 having a steering wheel 3. Positioned in cockpit 1 behind steering wheel 3 is an indicating unit 2 that is operable by at least two operating devices 4 and 5, e.g., for selecting and/or choosing menu items depicted on indicating unit 2. In the discussion below, identical reference characters refer to similar objects.

Figure 2:
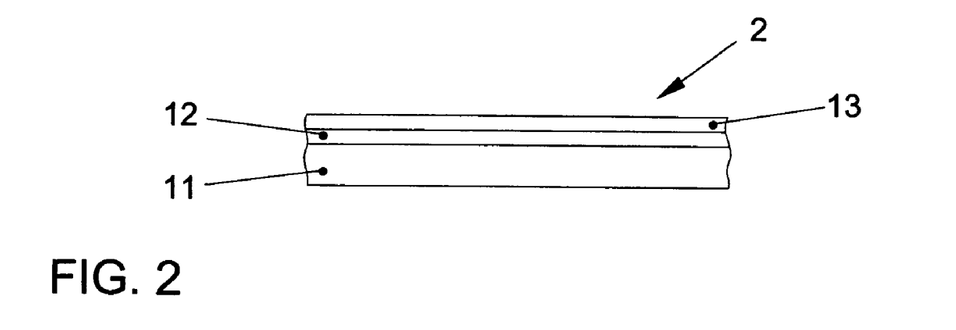
FIG. 2 is a cross-sectional view of an example embodiment of an indicating unit.

FIG. 2 is a cross-sectional view of an example embodiment of indicating unit 2. Indicating unit 2 has a display 11 for optical depiction of information concerning motor vehicle 1, the optical depiction being accomplished by the emission of light. A glass layer 12 is positioned on display 11, i.e., on the side of display 11 that is visible in the installed state, and a passive decorative layer 13 is positioned on glass layer 12, passive decorative layer 13 being substantially non-transparent at a position when display 11 is emitting no light at that position, and passive decorative layer 13 being substantially transparent when display 11 is emitting light at that position. A passive decorative layer 13 of this kind may be obtained, for example, under the trade name MirrorTV™ of Phillips.

Passive decorative layer 13 may look like a metallic layer, e.g., like a chrome layer.

Glass layer 12 may be omitted, and passive decorative layer 13 may be positioned directly on display 11.

Figure 3:
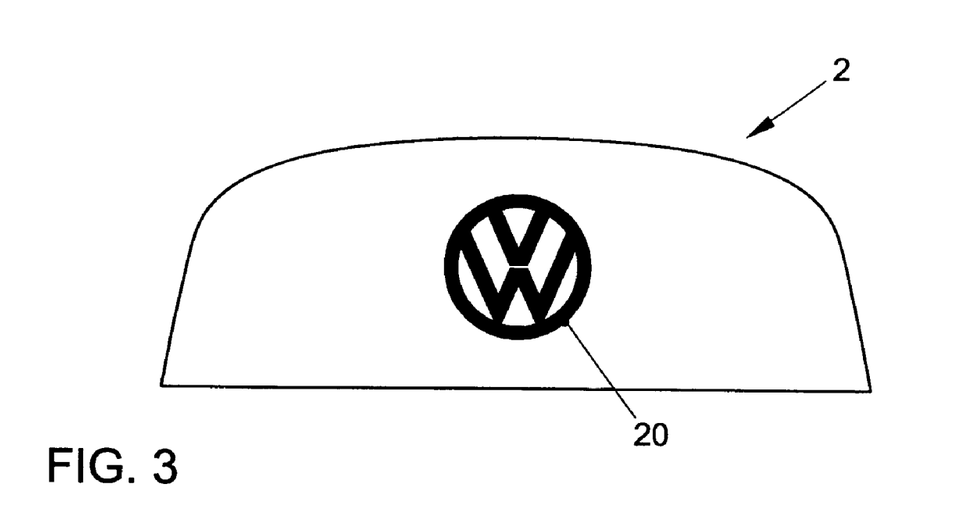
FIG. 3 illustrates an example embodiment of an indicating unit.

FIG. 3 illustrates an example embodiment of indicating unit 2 at a time at which it is depicting a company logo 20. Provision is made here for passive decorative layer 13 to be positioned only in a region marked by company logo 20, so that company logo 20 is visible in the switched-off state, or when no light is being emitted by display 11. In an example embodiment, passive decorative layer 13 may cover display 11, for example, substantially completely. In this case, for example, provision may be made, for depiction of company logo 20 by display 11, for light to be emitted in a region around company logo 20 but not in the region of company logo 20 itself. In this case company logo 20 appears as a metallic surface against an illuminated background. Provision may, for example, also be made, for depiction of company logo 20 by display 11, for light to be emitted in the region of company logo 20 itself but not in a region around company logo 20. In this case, company logo 20 appears as an illuminated surface having a metallic surface as background.

Two different passive layers may also be provided (next to one another), by the one passive layer the display being substantially completely covered and being concealed when motor vehicle 1 is in the switched-off state, and by the other passive layer a company logo being depicted which is visible when motor vehicle 1 is in the switched-off state, or when no light is being emitted by display 11.

Figure 4:
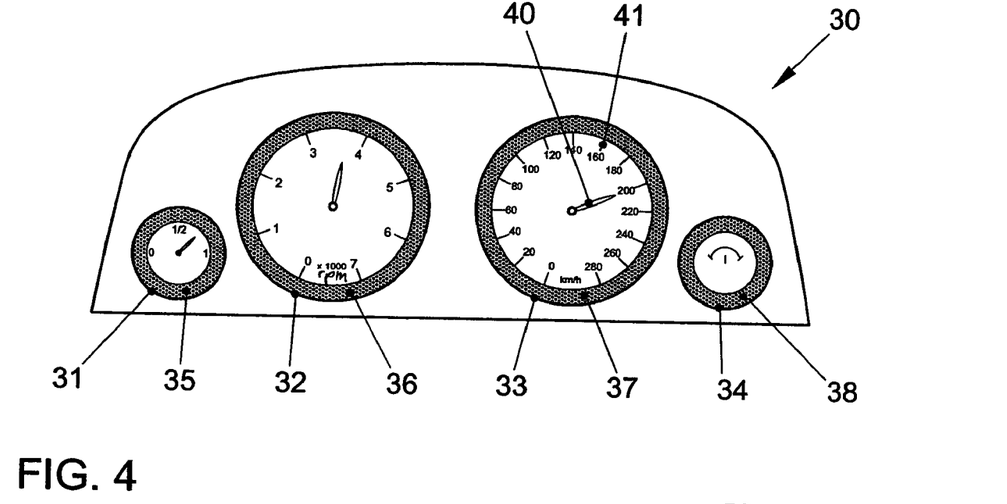
FIG. 4 illustrates an example embodiment of an indicating unit.

FIG. 4 illustrates an example embodiment of an indicating unit 30 for use as indicating unit 2, in which context FIG. 4 depicts indicating unit 30 in a state referred to as the "driving state." Indicating unit 30 corresponds in its configuration to the configuration of indicating unit 2 illustrated in FIG. 2. On indicating unit 30, an analog fuel indicator 31, an analog engine speed indicator 32, an analog speed indicator 33 having a scale 41 and a pointer 40, and an analog temperature indicator 34 are depicted by display 11. Analog fuel indicator 31, analog engine speed indicator 32, analog speed indicator 33 and analog temperature indicator 34 each have a border 35, 36, 37, 38. Borders 35, 36, 37, 38 are depicted by passive decorative layer 13 and look, for example, like metal surfaces.

Provision may be made for passive decorative layer 13 to be positioned only in a region marked by borders 35, 36, 37, 38, so that borders 35, 36, 37, 38 are visible only in the switched-off state—or when no light is being emitted by display 11. In an example embodiment, passive decorative layer 13 may cover display 11, for example, substantially completely. In this case, for example, provision may be made that for depiction of borders 35, 36, 37, 38 by display 11, no light is emitted in the region of borders 35, 36, 37, 38, i.e., immediately beneath borders 35, 36, 37, 38.

Company logo 20 and, e.g., borders 35, 36, 37, 38 may also be depicted by an active decorative layer that may assume a state in which it is substantially transparent, and that may assume a state in which it is substantially non-transparent, in which context it is possible to change between the two states by application of a voltage. Provision may be made, e.g., for the active decorative layer to be (substantially) transparent in an energyless state, i.e., when substantially no voltage is applied, and to be (substantially) non-transparent when a voltage is applied.

Figure 5:
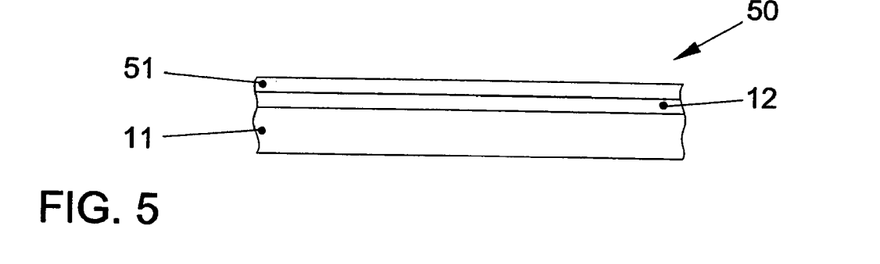
FIG. 5 is a cross-sectional view of an example embodiment of an indicating unit.

FIG. 5 is a cross-sectional view of an example embodiment of an indicating unit 50 of this kind. Corresponding to the example embodiment illustrated in FIG. 2, a display 11 for optical depiction of information concerning motor vehicle 1 is provided. In this case, the optical depiction may (optionally) be accomplished by the emission of light. An optional glass layer 12 is arranged on display 11, i.e., on the side of display 11 visible in the installed state, and an active decorative layer 51 is positioned on glass layer 12.

With the aid of active decorative layer 51, borders 35, 36, 37, 38 may be depicted, for example, as white rings. Two (or more) active decorative layers, adjustable independently of one another, may also be arranged above or next to one another. Provision may be made, for example, for borders 35, 36, 37, 38 to be depicted, for example, as white rings, by the one decorative layer, and for a company logo to be depictable, for example, in blue or in blue and white, by the other active decorative layer.

Active decorative layer 51 may be, for example, an electrochromic (EC) layer, a liquid-crystal layer (cholesteric film or CLC, i.e., cholesteric liquid crystals), a ceramic layer, etc. Suitable electrochromic layers may be obtained, for example, from Chelix Technologies Corp., 580 Mercury Drive, Sunnyvale, Calif. 94085 USA (cf. www.chelix.com). Laminated Glazing and Insulation Glass Unit with SageGlass® of Sage may also be used. Further information about possible active decorative layers is believed to be described, for example, by the Internet sites:

www.chelix.com/products_luxvu.html;
www.chelix.com/pdfs/HPP_pigment_overview.pdf;
www.chelix.com/products_luxvu_how.html;
www.gentex.com/automotive_products2.html; and
www.sage.com.

Figure 6:
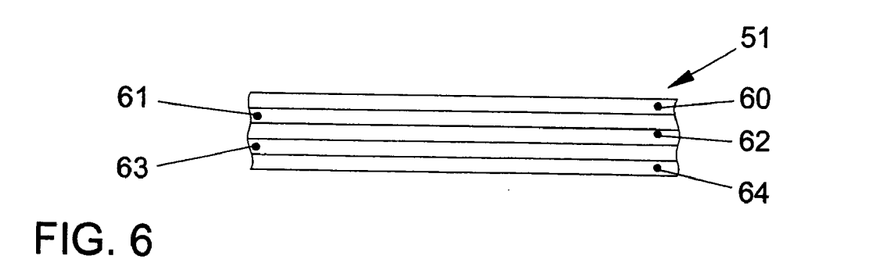
FIG. 6 is a cross-sectional view of an example embodiment of an active decorative layer.

FIG. 6 is a cross-sectional view of an example embodiment of an active decorative layer 51. An electrochromic (EC) electrode 63 is positioned on a transparent conductor layer 64. A layer 62 made of an iron-containing conductor is positioned on electrochromic (EC) electrode 63. A back electrode 61 is positioned on layer 62 made of the iron-containing conductor, and a transparent conductor layer 60 is positioned on back electrode 61.

Figure 7:
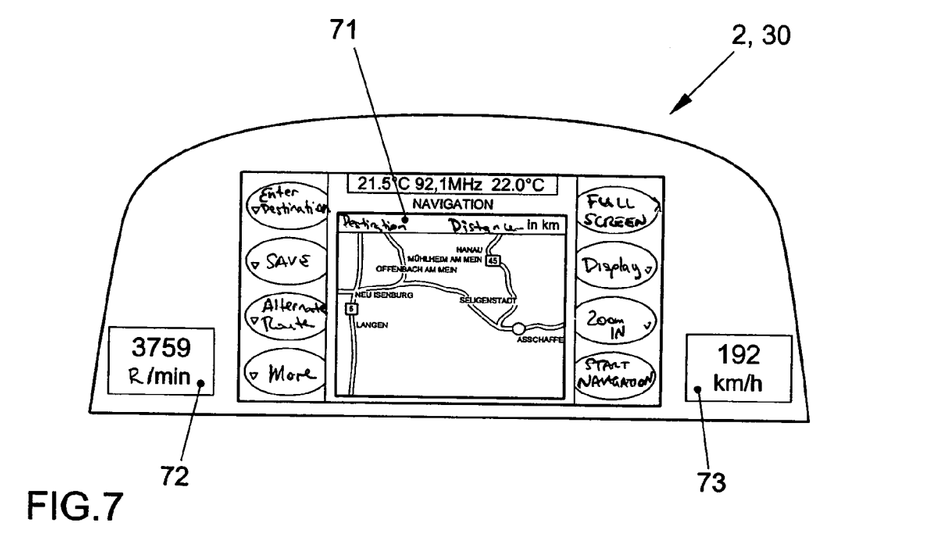
FIG. 7 illustrates an example embodiment of an indicating unit.

FIG. 7 illustrates an example embodiment of an indicating unit 2 or of indicating unit 30 in an information state, indicating unit 2 depicting a mask 71 for a navigation system. Company logo 20 and borders 35, 36, 37, 38 are transparent because of light emitted by the display, and are thus not visible. In addition to mask 71 for the navigation system, indicating unit 2 or 30 shows a digital indicator 72 for a rotation speed of an engine of motor vehicle 1, and a digital indicator 73 for a speed of motor vehicle 1.

Figure 8:
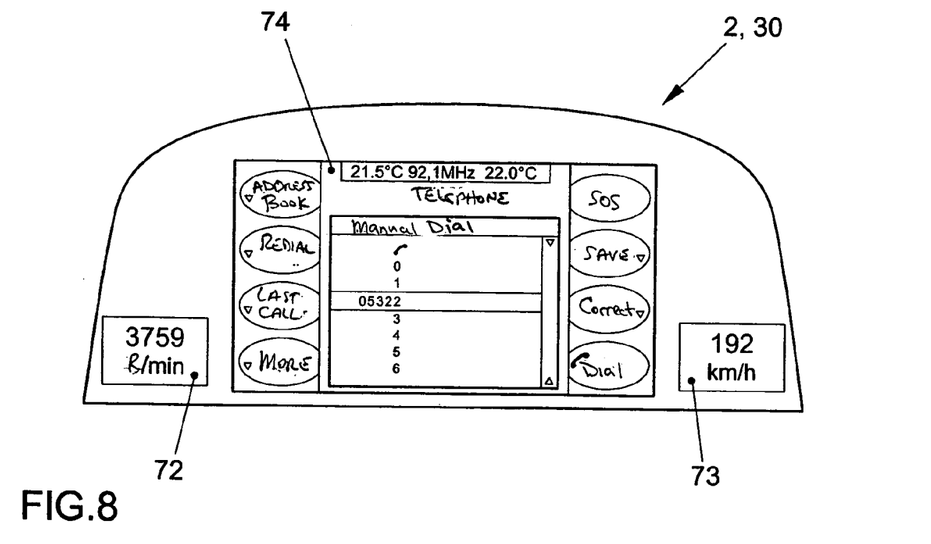
FIG. 8 illustrates an example embodiment of an indicating unit.

FIG. 8 illustrates an example embodiment of indicating unit 2 or of indicating unit 30 in an information state, indicating unit 2 or 30 depicting, in addition to digital indicators 72 and 73 for the rotation speed of the engine of motor vehicle 1 and for the speed of motor vehicle 1, a mask 74 for a telephone. Company logo 20 and borders 35, 36, 37, 38 are once again transparent because of light emitted by the display, and are thus not visible.

Figure 9:
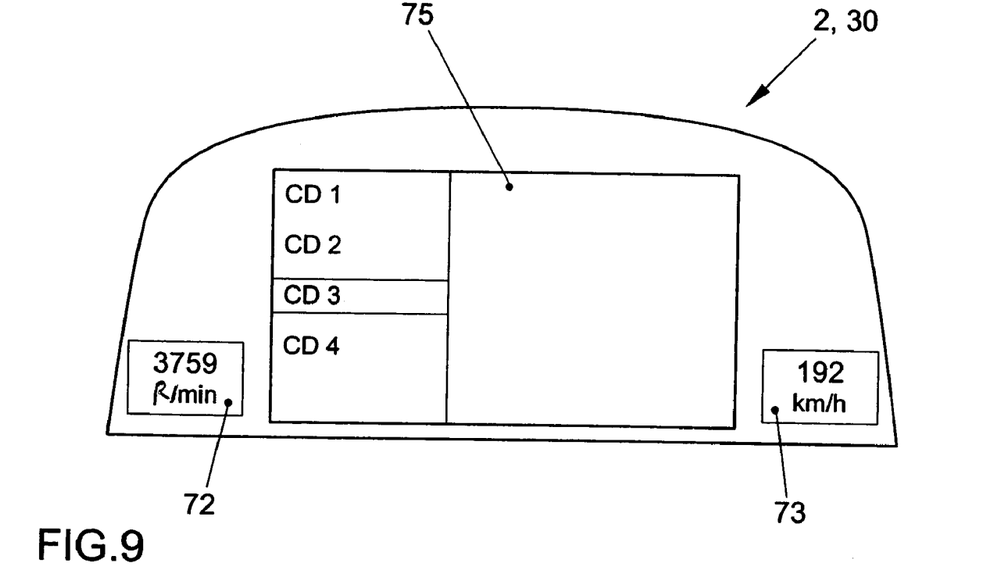
FIG. 9 illustrates an example embodiment of an indicating unit.

FIG. 9 illustrates an example embodiment of an indicating unit 2 or of indicating unit 30 in an information state, indicating unit 2 or 30 depicting, in addition to digital indicators 72 and 73 for the rotation speed of the engine of motor vehicle 1 and for the speed of motor vehicle 1, a mask 75 for a music system. Company logo 20 and borders 35, 36, 37, 38 are once again transparent because of light emitted by the display, and are thus not visible.

In the case in which indicating apparatuses 2 and 30 are arranged in accordance with indicating apparatus 50, provision is made for the active decorative layer to be activated in the information state such that it is transparent.

Further information about masks 71 and 74 and their coaction with operating elements that may be arranged in accordance with operating elements 4 and 5 is described, e.g., in PCT International Published Patent Application No. WO 00/21795, U.S. Pat. No. 6,411,877 and U.S. Patent Application Publication No. 2002-002432, each of which is expressly incorporated herein in its entirety by reference thereto. Further information about mask 75 and its coaction with operating elements that may be arranged in accordance with operating elements 4 and 5 is described, e.g., in German Published Patent Application No. 101 39 693 and U.S. Patent Application Publication No. 2004-046751, each of which is expressly incorporated herein in its entirety by reference thereto.

Figure 10:
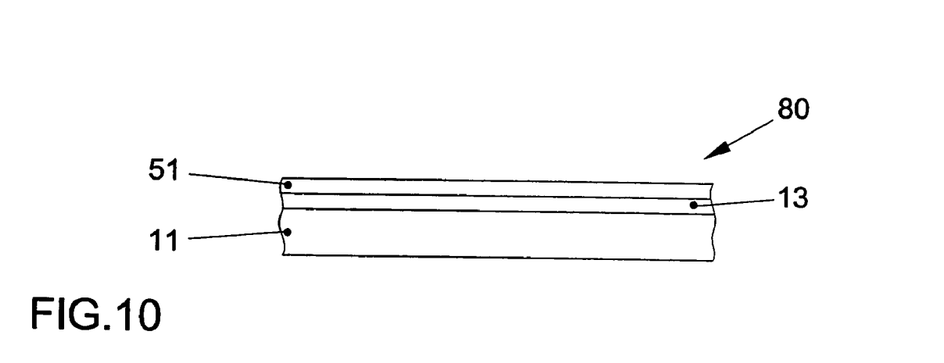
FIG. 10 is a cross-sectional view of an example embodiment of an indicating unit.

FIG. 10 is a cross-sectional view of an example embodiment of an indicating unit 80. Indicating unit 80 has a display 11 for optical depiction of information concerning motor vehicle 1, such as speed, engine speed, engine temperature, fuel level, etc., or such as the information depicted by masks 71, 74, and 75, the optical depiction being accomplished by the emission of light. A passive decorative layer 13 is positioned on display 11, i.e., on the side of display 11 visible in the installed state, passive decorative layer 13 being substantially non-transparent at a position when display 11 is emitting no light at that position, and the passive decorative layer being substantially transparent at that position when display 11 is emitting light at that position. Positioned on passive decorative layer 13 is an active decorative layer 51 that, independently of display 11, may assume a state in which it is substantially transparent and that, independently of display 11, may assume a state in which it is substantially non-transparent.

Indicating units 2 and 30 may be particularly suitably combined in this fashion. For example, in a base state in which indicating unit 80 is switched off (or in which no light is being emitted by display 11), indicating unit 80 may appear to be covered by a, for example metallic, covering and/or may depict a company logo. Provision may be made for passive decorative layer 13 to be positioned only in a region marked by the company logo, so that in the base state—or when no light is being emitted by display 11—the company logo is visible. In an example embodiment, passive decorative layer 13 may cover display 11, e.g., substantially completely. Two different passive layers may also be provided (next to one another), by the one passive layer display 11 being substantially completely covered and being concealed in the base state, i.e., when the display is emitting no light, and by the other passive layer a company logo being depicted that is visible in the base state, i.e., when display 11 is emitting no light.

Indicating unit 80 may moreover correspond, in a driving state, to indicating unit 30 as illustrated in FIG. 4, borders 35, 36, 37, 38 being depicted with the aid of active decorative layer 51. For that purpose, for example, an electrochromic layer 62 is provided only in the region of borders 35, 36, 37, 38. In the driving state, active decorative layer 51 is supplied with voltage so that it is visible in the form of the, for example, white, borders 35, 36, 37, 38. The other elements of analog fuel indicator 31, analog engine speed indicator 32, analog speed indicator 33, and analog temperature indicator 34 may be depicted by the display. Provision may, however, also be made, for example, for depicting scale 41 using active decorative layer 51, active decorative layer 51 having in this case a correspondingly arranged electrochromic layer 62. Electrochromic layer 62 may, for example, have a different color for scale 42 than for borders 35, 36, 37, 38.

In an information state, active decorative layer 51 is not supplied with voltage and is therefore transparent. Passive decorative layer 13 is also transparent because of the light emitted by display 11. Masks and displays as illustrated in FIG. 7, FIG. 8, and FIG. 9 are also depicted.

Figure 11:
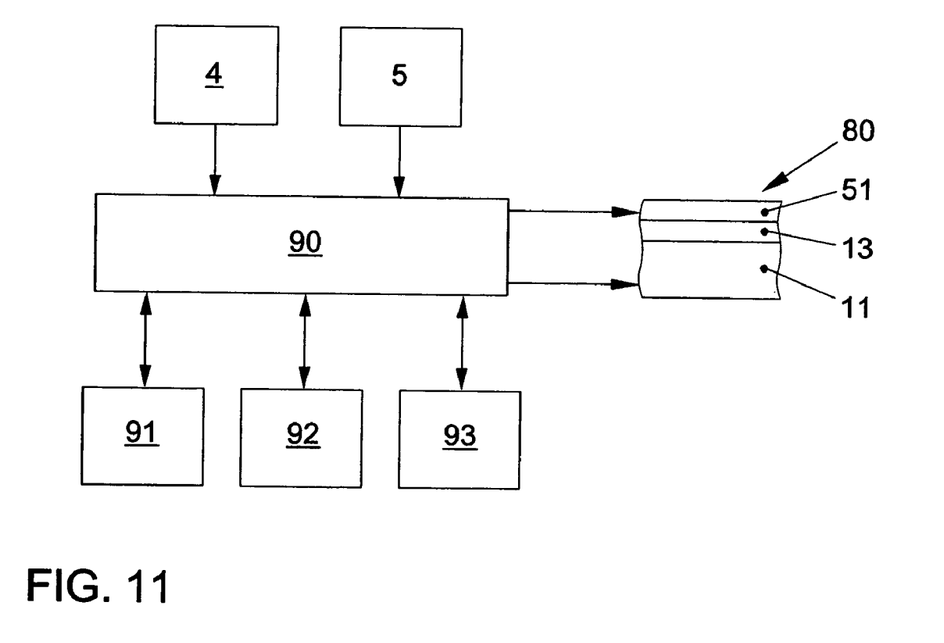
FIG. 11 illustrates an example embodiment of a control system.

FIG. 11 illustrates an example embodiment of a control system 90 by which indicating unit 80 may be brought into a base state, a driving state, and an information state. Control system 90 is electrically connected for that purpose to display 11 and to active decorative layer 51. Inputs into the control system are accomplished via operating elements 4 and 5. Control system 90 is moreover electrically connected to components 91 for a navigation system, to components 92 for a telephone, and to components 93 for a music system. Control systems for indicating units 2, 30, and 50 are arranged in correspondingly adapted fashion.

Figure 12:
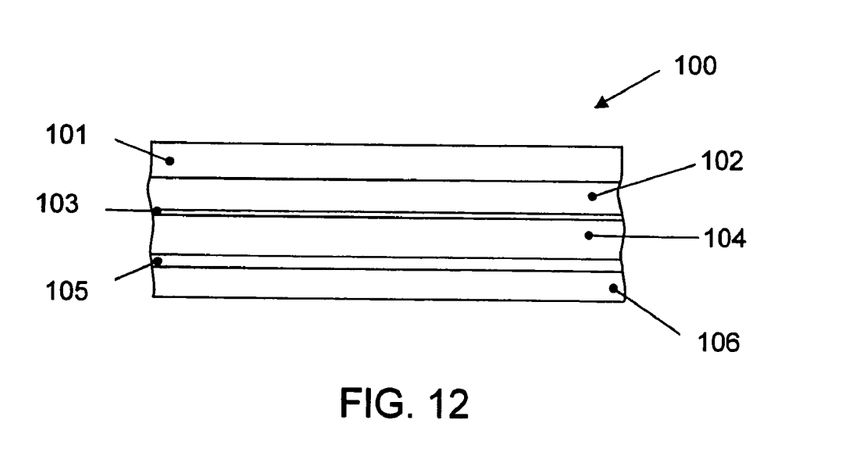
FIG. 12 is a cross-sectional view of a REM layer.

In an example embodiment, active decorative layer 51 may be a REM layer (reversible electrochemical mirror). FIG. 12 illustrates a cross-section of such a REM layer 100. REM Layer 100 includes two glass layers 101 and 106, between which a front electrode 102 made out of ITO and a back grid electrode 105 are positioned. A silver deposition layer 103 and an electrolyte 104 are positioned between front electrode 102 and back grid electrode 105. Silver deposition layer 103 is non-transparent and reflective. It gives REM layer 100 a metallic look. By applying a particular voltage to front electrode 102 and back grid electrode 105, silver deposition layer 103 dissolves and REM layer 100 becomes transparent.

Further details regarding possible arrangements of a REM layer may be taken from the article, "REVERSIBLE ELECTROCHEMICAL MIRROR (REM) SMART WINDOW," by D. M. Tench, M. A. Cunningham, J. J. Kuo, P. V. Rowell, and L. F. Warren, Jr., The Electrochemical Society, Inc., 203rd Meeting, Paris, France, Apr. 27, 2003 to May 2, 2003, Session Q1, Electrochromic Materials and Applications, which is expressly incorporated herein in its entirety by reference thereto, as well as from U.S. Pat. Nos. 5,903,382, 5,923,456 and U.S. Pat. No. 6,301,039, each of which is expressly incorporated herein in its entirety by reference thereto.

Using REM layer 100, e.g., borders 35, 36, 37, 38 may be represented as metallic rings, for example. Two (or more) REM layers, which may be adjusted independently of each other, may also be positioned one above the other or side by side. In addition, REM layers, which are adjustable independently of each other, and active decorative layers made of EC or CLC may be positioned one above the other or side by side. In this context, it may be provided that, e.g., using a REM layer, borders 35, 36, 37, 38 may be represented as metallic rings, for example, and that, using an active decorative layer made of EC or CLC, a company logo may be displayed, for example, in blue or in blue and white.

REM layer 100 may also replace passive decorative layer 13 explained with reference to FIG. 3. In this context, it may be provided that REM layer 100 is only arranged in a region defined by company logo 20, so that company logo 20 is visible in the switched-off state, i.e., when no voltage is applied to front electrode 102 and back grid electrode 105. In an example embodiment, REM layer 100 may cover display 11, e.g., essentially completely.

The elements and layers in the Figures are drawn with simplicity and clarity in mind, and not necessarily to exact scale. For example, the orders of magnitude of certain elements or layers are illustrated with considerable exaggeration as compared with other elements or layers, in order to improve understanding of the example embodiments described herein.

LIST OF REFERENCE CHARACTERS

1 Motor vehicle
2, 30, 50, 80 Indicating unit
3 Steering wheel
4, 5 Operating devices
11 Display
12 Glass layer
13 Passive decorative layer
20 Company logo
31 Fuel indicator
32 Engine speed indicator
33 Speed indicator
34 Temperature indicator
35, 36, 37, 38 Border
40 Pointer
41 Scale
51 Active decorative layer
60, 64 Transparent conductive layer
61 Back electrode
62 Layer made of an iron-containing conductor
63 Electrochromic electrode
71 Mask for a navigation system
72 Digital indicator for an engine speed
73 Digital indicator for a speed
74 Mask for a telephone
75 Mask for a music system
90 Control system
91 Components for a navigation system
92 Components for a telephone
93 Components for a music system
100 REM layer
101, 106 Glass layer
102 Front electrode
103 Silver deposition layer
104 Electrolyte
105 Back grid electrode

What is claimed is:

1. An indicating apparatus for a motor vehicle, comprising:
   a display configured to optically depict information relating to a motor vehicle;
   an active decorative layer arranged on the display, the active decorative layer having a substantially transparent state in an information state and a substantially non-transparent state in a driving state; and
   a control system configured to activate the active decorative layer, the active decorative layer one of (a) substantially transparent and (b) substantially non-transparent as a function of a control signal of the control system.

2. The indicating apparatus according to claim 1, wherein the active decorative layer is substantially transparent in an energyless state.

3. The indicating apparatus according to claim 1, wherein the active decorative layer is arranged as at least one of (a) a symbol and (b) a company logo.

4. The indicating apparatus according to claim 1, wherein the active decorative layer is arranged as at least one of (a) a part of an analog indicator and (b) a border of an analog indicator.

5. The indicating apparatus according to claim 4, wherein the control system is configured to depict on the display at least one of (a) a pointer of the analog indicator and (b) a scale of the analog indicator.

6. The indicating apparatus according to claim 4, wherein the control system includes at least one of (a) a navigation system, (b) a telephone and (c) a music system, the display configured to depict information outputted by the at least one of (a) the navigation system, (b) the telephone and (c) the music system.

7. The indicating apparatus according to claim 1, further comprising at least one of (a) a navigation system, (b) a telephone and (c) a music system, the display configured to depict information outputted by the at least one of (a) the navigation system, (b) the telephone and (c) the music system.

8. The indicating apparatus according to claim 1, wherein the active decorative layer includes a REM layer.

9. An indicating apparatus for a motor vehicle, comprising:
   a display configured to optically depict information relating to a motor vehicle;
   an active decorative layer arranged on the display, the active decorative layer having a substantially transparent state in an information state and a substantially non-transparent state in a driving state; and
   a control system configured to activate the active decorative layer, the active decorative layer one of (a) substantially transparent and (b) substantially non-transparent as a function of a control signal of the control system, wherein the control system is configured to bring the display into a driving state and an information state, in the driving state, the display configured to depict an analog indicator to indicate a speed of the motor vehicle, in the information state, the display configured to depict a digital indicator to indicate a speed of the motor vehicle and the display configured to indicate additional information.

10. The indicating apparatus according to claim 9, wherein the additional information includes an output of a navigation system.

11. The indicating apparatus according to claim 9, wherein the control system is configured to control the display so that the active decorative layer corresponds to a border of the analog indicator.

12. The indicating apparatus according to claim 11, wherein the active decorative layer includes a REM layer.

13. The indicating apparatus according to claim 9, wherein the active decorative layer is substantially transparent in an energyless state.

14. The indicating apparatus according to claim 9, wherein the active decorative layer is arranged as at least one of (a) a symbol and (b) a company logo.

15. The indicating apparatus according to claim 9, wherein the active decorative layer is arranged as at least one of (a) a part of an analog indicator and (b) a border of an analog indicator.

16. The indicating apparatus according to claim 15, wherein the control system is configured to depict on the display at least one of (a) a pointer of the analog indicator and (b) a scale of the analog indicator.

17. The indicating apparatus according to claim 15, wherein the control system includes at least one of (a) a navigation system, (b) a telephone and (c) a music system, the display configured to depict information outputted by the at least one of (a) the navigation system, (b) the telephone and (c) the music system.

18. The indicating apparatus according to claim 9, further comprising at least one of (a) a navigation system, (b) a telephone and (c) a music system, the display configured to depict information outputted by the at least one of (a) the navigation system, (b) the telephone and (c) the music system.

* * * * *